Figure 1:
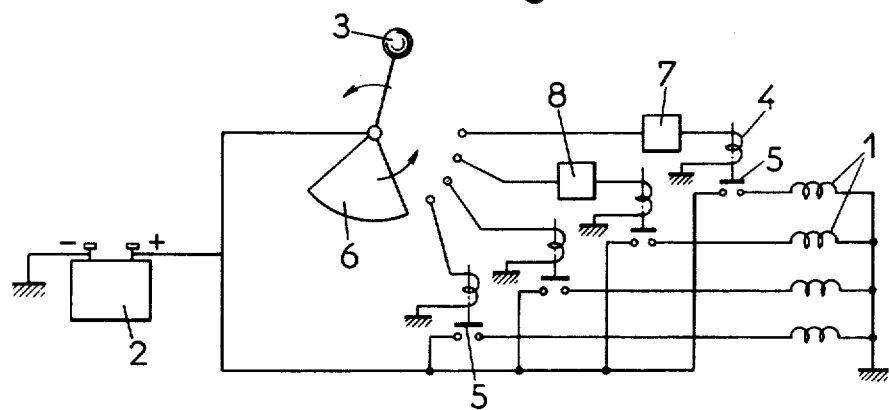

United States Patent [19]

Jollois

[11] 4,292,556
[45] Sep. 29, 1981

[54] SPEED REDUCING EQUIPMENT, PARTICULARLY FOR VEHICLES

[75] Inventor: Jean-Marie Jollois, Courbevoie, France

[73] Assignee: Labavia-S.G.E., Paris, France

[21] Appl. No.: 57,003

[22] Filed: Jul. 12, 1979

[30] Foreign Application Priority Data

Jul. 20, 1978 [FR] France .............................. 78 21548

[51] Int. Cl.³ ............................................ H02K 49/00
[52] U.S. Cl. ........................................ 310/93; 310/94
[58] Field of Search ................................... 310/92–96

[56] References Cited

U.S. PATENT DOCUMENTS 3,609,424  9/1971  Murakami ............................ 310/93

Primary Examiner—Donovan F. Duggan
Attorney, Agent, or Firm—Cushman, Darby & Cushman

[57] ABSTRACT

The invention concerns speed reducing equipment for vehicles, comprising an eddy current speed reducer itself comprising four inductor windings, a battery, and control means actuated by a five-position lever.

Safety means are provided for automatically preventing the maintenance of the energization of the speed reducer corresponding respectively to positions 4 and 3 after respectively time delays of the order of 20 seconds and 3 minutes and the inductor windings are reinforced so that they may generate a number of ampere-turns greater than that which they are usually capable of producing, which makes it possible to obtain high torques when cold for a speed reducer of given dimensions.

17 Claims, 2 Drawing Figures

SPEED REDUCING EQUIPMENT, PARTICULARLY FOR VEHICLES

The invention relates to speed reducing equipment, particularly for vehicles, comprising an eddy current speed reducer or retarder itself comprising n inductor windings, n being a whole number equal to 3, 4 or 5, a DC voltage source and control means actuated by a member to n+1 stable positions for causing the speed reducer to generate n+1 distinct braking torques whose values increase from 0 to a maximum value when the actuating member passes from its position 0 to its position of order n, which results in a number of inductor windings increasing from 0 to n being connected respectively to the source.

By "inductor winding" or simply "winding", there is to be understood here and in the rest of the description not only an inductor winding properly speaking but also a group of such windings connected together once and for all in series and/or in parallel.

In what follows:

P represents the maximum electrical power able to be absorbed by the whole of the different windings of the speed reducer, when these latter are all energized permanently, without the resulting heating causing appreciable deterioration of this speed reducer.

N represents the corresponding number of amperes-turns for the whole of the windings, this number being determined on the basis of the same criterium of maximum tolerable heating when they are all energized permanently, P' represents the maximum electrical power able to be delivered by the source during a long period of time without there resulting appreciable damage to this source, considering its capacity of recovery by automatic recharge after use, said source being chosen such that the values P and P' are practically equal, and S represents the section of the conducting wire forming each of these windings.

For a given supply voltage, a given magnetic circuit, a given general dimensioning for each winding and a given type of conducting wire, the number N may be considered as proportional on the one hand to $\sqrt{P}$ and on the other hand to S.

In equipment of the kind in question known up to present, the source and the speed reducer were chosen so as to comply with the "safety criterium" defined as follows: all things being equal in other respects, number N is determined, i.e. section S, so that the maximum admissible heating of the speed reducer is observed during the permanent application of power P to the windings.

The invention has as its aim, especially, to increase the maximum slowing down torque capable of being generated when cold by such an equipment from a given voltage source and for a given speed reducing magnetic circuit.

In this connection, it can be mentioned that a momentary overenergization of the speed reducer has already been proposed.

But the solutions proposed to this end up to present require:

either at least one additional battery, with corresponding wiring and control members, or at least one additional contactor mounted so as to modify the mutual series or parallel connections of certain windings, with again the associated wiring.

Furthermore, the windings considered, since they are chosen so as to comply with the above defined safety criterium, linked to the hypothesis of total permanent energization of these windings, could not generate slowing down torques as high as they could have done if their choice had been determined with respect to a rapidly neutralized total energization.

The invention does away with these different disadvantages by proposing a particularly simple solution leading to the establishing of high slowing down torques when cold and this in very economic conditions, not only insofar as the cost price of the equipment is concerned but also insofar as its operating cost is concerned, considering the economy in energy which it makes possible.

It consists principally:

in arranging the different inductor windings of the speed reducers comprised in the equipment of the kind in question so that they generate together KN ampere-turns when they are all energized, then consuming a power $K^2P$, K being a coefficient greater than 1, and in providing safety means for automatically preventing the energization of the speed reducer to be maintained beyond a dangerous threshold, corresponding to at least position n+1 of the control member.

In preferred embodiments, recourse is had furthermore to one and/or the other of the following arrangements:

the section of the conducting wire forming each winding is K times greater than that of the wire forming windings of the same dimensions in known comparable speed reducers of the same weight and the same volume, and the number of turns per winding is K times smaller than in known speed reducers, the windings are all identical, the whole number n is equal to 4 and the safety means are provided for automatically cancelling out, at least partially, beyond appropriate dangerous thresholds, energization of the speed reducer for respectively positions 3 and 4 of the control member, in equipment according to the previous item, the safety means are slaved to time and are arranged so as to cancel out at least partially the energization of the speed reducer after a delay $t_1$, between 10 and 30 seconds for position 4 of the control member and after a delay $t_2$, between 1 to 4 minutes for position 3 of said member, in equipment according to any one of the two preceding items, coefficient K is equal to $\sqrt{2}$, the voltage source is a battery capable of withstanding without damage short and repeated discharges and to deliver, during these discharges, high amperage currents, the recharge of this battery being rapidly and easily achieved.

The invention comprises, apart from these principal arrangements, certain other arrangements which are preferably used at the same time and which will be more explicitly discussed hereafter.

In what follows, one preferred embodiment of the invention will be described with reference to the accompanying drawings in a way which is of course in no wise limiting.

Figure 2:
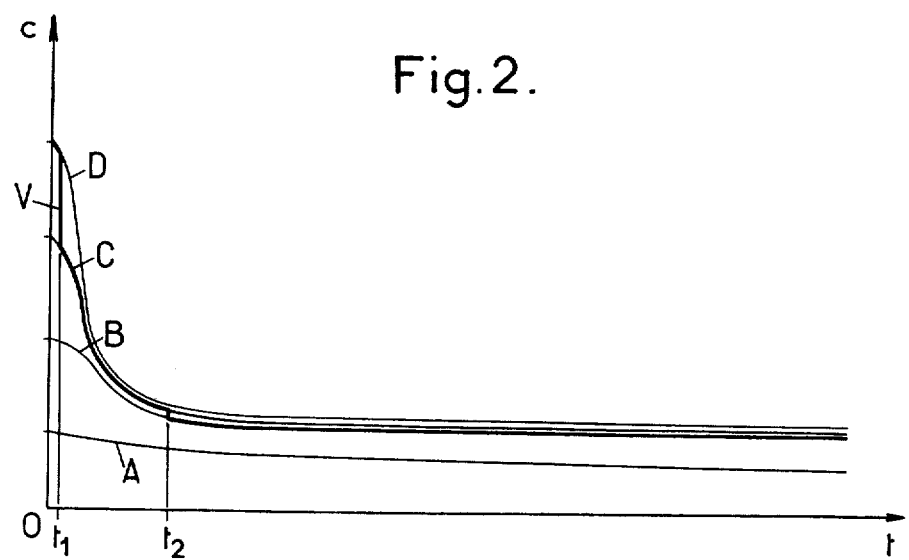

FIG. 1 of these drawings, is the circuit diagram of a speed reducing equipment constructed according to the invention, and FIG. 2 is a graph for explaining the operation of this equipment.

In a manner known per se, the speed reducing equipment considered comprises:

an eddy current speed reducer or retarder comprising four identical inductor windings 1,
a battery 2,
and control means actuated by a five-position lever 3.

Each of the windings 1 considered above is in general formed from a pair of two diametrically opposed elementary windings electrically connected in series together, these two elementary windings forming part of a ring of eight such elementary windings carried by the stator of the speed reducer coaxially to the shaft thereof.

The battery 2 is generally chosen so as to generate a voltage of 12 or 24 volts.

The control means comprise four contactor relays 4 adapted to control the closing and the opening of as many switches 5 mounted respectively in the electric supply circuits of the windings 1 from battery 2.

Control lever 3 is associated with a switch designed so that in rank order position 0 of this lever (shown in FIG. 1) no contactor 4 is energized, all the switches 5 being then open, whereas putting said lever to rank order positions 1, 2, 3 and 4 results respectively in the energization of one, two, three and four contactors 4 and so the cumulated closing of the corresponding switches 5: in other words, for position p of lever 3, p being a whole number equal to 1, 2, 3 or 4, a number p of switches are closed simultaneously, which corresponds to the electrical supply of p windings 1.

In known embodiments, the different characteristics of windings 1 are calculated with respect to the characteristics of the magnetic circuit of the speed reducer, so that putting lever 3 in its rank order position 4, i.e. maximum power energization P or "full energization," for a long period of time—for example of the order of 10 minutes or more, as is frequently required for reducing the speed of heavy vehicles on long downhill runs—causes the maximum admissible heating of these windings without appreciable deterioration.

Furthermore, battery 2 is chosen so that it is precisely said "full energization" which draws from this battery the maximum instantaneous electrical power P' compatible with its recharging capacity.

Now the applicant has observed that at full energization the torque generated by the speed reducer diminishes rapidly in a high proportion and becomes after a very short time substantially identical to that which would be obtained with energization of the speed reducer corresponding to a lower position, by one or even two units, of the lever.

This phenomenon is due in particular to the heating of the rotor, which then approaches the Curie point, which reduces its magnetic permeability and renders the magnetization capacity of the speed reducer superabundant.

In other words, in the embodiment described here, the rank order position 4 and even that of rank 3 of the control lever are really only useful during relatively short periods during which the speed reducer remains "cold" or at least not very warm: the torque really developed permanently by the speed reducer when hot for these positions is in fact scarcely greater than that which corresponds to rank order position 2 of the control lever.

To take advantage of this observation, and to preserve the battery from any useless power drain, there is provided according to the invention means for causing the control means to move back automatically from their rank 4 condition to that of rank 3, then from their rank 3 condition to that of rank 2, as soon as this drain becomes pointlessly superabundant.

These means may be slaved to the temperature of an element heated by the speed reducer.

According to a preferred embodiment, they are slaved to time and so are formed by time delay devices 7 and 8 mounted respectively in the energization circuits of the two conductors 4 corresponding respectively to the rank order positions 4 and 3 of lever 3: as an example and purely by way of illustration, the time delay relative to rank order position 4 corresponds to a delay $t_1$ between 10 and 30 seconds and that relative to rank order position 3 corresponds to a delay $t_2$ between 1 and 4 minutes.

It is this hypothesis of time delays which has been shown schematically on the graph of FIG. 2.

In this graph there is shown as ordinates the torques generated by the speed reducer and as abscissa the times.

The variations of torques corresponding respectively to the rank order positions 1, 2, 3 and 4 of lever 3 are shown respectively in this graph by curves A, B, C and D.

It can be seen that the torques generated by the speed reducer increase the more rapidly the higher the starting energization level and that after a short period curves B, C and D are practically merged within 10%.

Because of the action of the above time delay devices 7 and 8, which switch respectively out of the circuit contactors 4 of the two stages of ranks 4 and 3 of the control after times $t_1$ and $t_2$, the law of variations with respect to time of the speed reducing torque generated by the speed reducer when lever 3 is placed to its position of rank order 4 is that which has been shown by the thick line curve V in FIG. 2: this curve is in short very close to curve D although, for a long period of operation, it corresponds practically to a consumption of electricity smaller by a half.

Having thus neutralized when hot the maximum energization stages of the speed reducer, the applicant observed furthermore that there was no longer need to take into consideration for the choice of the windings the safety criterium recalled above, a criterium which takes into account the simultaneous and permanent energization of these windings at full power P considering that such permanent energization was now made impossible by the safety means.

He has, according to the invention, taken advantage of this observation to increase accordingly deliberately by multiplying it by a coefficient K, the maximum number of ampere-turns N defined above, capable of being generated by windings 1.

In the embodiment described above, comprising four identical thus "reinforced" windings and control means having four positions two of which can be automatically neutralized, the reinforcement coefficient K is advantageously equal to $\sqrt{2}$.

More generally, this coefficient is preferably given a value between 1.1 and 1.7.

Under these conditions, the torque generated during permanent operation by the speed reducer for position 2 of its control lever, as well as the corresponding heating, are scarcely greater than those observed in the preceding example, the curve portion corresponding to this permanent operation being then comprised between the two practically horizontal sections of the two curves B and D of FIG. 2: there exists then no risk of damage to the speed reducer.

On the contrary, the torque generated when cold is, for all the positions of the control lever, increased in the ratio K except for the magnetic saturation of course, and this without any risk of dangerous heating considering the neutralizations provided accordingly.

This advantage is very important in practice.

It allows in fact:
either an appreciable overtorque to be obtained when cold for a speed reducer of given size and weight,
or, to comply with given torque requirement when cold, a smaller and lighter speed reducer to be adopted than comparable ones known.

It is to be noted that the increase in a ratio K of the ampere-turns capable of being generated by the thus "reinforced" windings 1 may be obtained, without any modification of the general dimensions of each winding, by an increase in the same ratio K of the section S of the conducting wire forming this winding and by a reduction also in a ratio K of the number of turns of said winding.

It is to be noted that the above ampere-turn increase in the ratio K causes an increase in a ratio $K^2$ of the electric power drained from battery 2. For position 4 of the control member, the maximum power drained from the battery—but here only provisionally—is then here equal to $K^2P$, if P has the value defined above.

Very opportunely this drain—relatively intense for positions of rank 3 and 4—is made possible by modern batteries: these lend themselves in fact to short and repeated drains of relatively high power without there resulting any practical disadvantage, considering the capacity of rapid subsequent recovery of these batteries by automatic recharging.

Thus it is that such a battery with a low internal impedance, capable of supplying at discharge a quantity of electricity of 150 Amperes-hour may perfectly deliver a current of 200 A for 30 seconds since the corresponding quantity of electricity is only 1.67 Ah: it is recalled that such batteries are usually mounted in heavy vehicles and that their recharging, provided by modern generators also mounted in such vehicles, corresponds to quantities of electricity reaching and even generally exceeding 50 Ah per hour.

It will moreover be noticed that in permanent operation, if K is equal to $\sqrt{2}$, the instantaneous power drained from the battery is equal to P only (rank 2 of the control) and it is therefore not greater than that corresponding to rank 4 of the control in accordance with the conventional solution with non-reinforced windings.

For a proper understanding of the above mentioned "reinforcement" of the windings, a comparative example is given hereafter purely by way of illustration:
in a conventional speed reducer with eight windings divided into four groups each comprising two windings in series, each of the windings, formed from 320 turns of copper wire having a section S equal to 4.37 mm$^2$ produced, with a supply of 24 V, a number N of ampere-turns equal to 8 300 with a total consumption of 2 500 Watts, in a speed reducer comparable to the preceding one, of the same weight and of the same volume, but equipped with reinforced windings according to the invention with a coefficient K equal to $\sqrt{2}$, each of these latter is formed from a number of turns equal to 226 (i.e. 320/K) formed from a copper wire having a section of 6.18 mm$^2$ (i.e. 4.37 K) each winding thus formed being capable of producing 11,738 ampere-turns (i.e. 8 300 K) for a power consumption of 5 000 Watts (i.e. 2 500 K$^2$).

More generally,
the consumption of known speed reducers at full power is generally between 2 000 and 3 500 Watts, this maximum consumption being able to be maintained permanently for long periods of time,
with the "reinforced" speed reducers of the invention, the consumption at full power is clearly greater, generally between 4 000 and 7 000 Watts, but can only be maintained for a short period of time.

Following which, and whatever the embodiment adopted, there is finally provided speed reducing equipment whose construction and operation follow sufficiently from what has gone before.

Such equipment has numerous advantages in relation to those known up to present, particularly that of allowing the creation of a high torque when cold, all things being equal in other respects, in remarkable conditions of economy, not only from the manufacturing but also from the operational point of view.

It may be noticed in particular that, in relation to the solutions known up to present, the invention does not require use of an additional battery nor an additional contactor: the mutual connections of the different windings are not modified and the contactors usually used to control the supply of these windings may be maintained as they are as well as all the connecting wiring.

As is evident and as it follows moreover already from what has gone before, the invention is in no wise limited to those of its modes of application and embodiments which have been more especially considered: it embraces, on the contrary, all variations thereof, particularly:
those where the different windings of the speed reducer are not identical to each other but present different impedances, some of these windings being for example formed from two elementary windings mounted permanently in series and one at least of the other windings, from two elementary windings mounted permanently in parallel, the KN ampere-turns capable of being generated by the whole of the energized windings being then distributed correspondingly between these windings and not equally therebetween,
those where the number of the positions of the control member are different from 5 and for example equal to 4 or 6,
those where only the last stage of the control is equipped with a safety device adapted to neutralize the energization after a predetermined time delay.

I claim:

1. A speed reducer device for a vehicle, comprising an electric retarder with n conductor windings, n being an integer chosen among 3, 4, and 5, a DC voltage source and control means with a control member having n+1 control positions for causing the retarder to generate n+1 braking torques whose values increase from 0 to a maximum value when the control member passes from its 0 position to its n position, said subsequent passages resulting respectively in the connection of the source to a number of inductor windings increasing from 0 to n, wherein, if P is the maximum electrical power, comprised between 2000 and 3500 Watts, capable of being absorbed by the whole of the n inductor windings when they are all permanently connected to the source, without the corresponding heating damages the retarder, each of said windings is chosen so as to consume a power $K^2P/n$ when it is connected to the source, K being a coefficient between 1.1 and 1.7, and safety means for automatically preventing the energization of the speed retarder to reach a dangerous threshold when the control member is in its last position n.

2. A speed reducing device as in claim 1, wherein the power $K^2P$ ranges from between 4 000 to about 7 000 Watts.

3. A speed reducer as in claim 1, wherein, in relation to the inductor windings of the known electric retarders consuming together a power P when they are all connected to the source, the inductor windings have for their conducting wires a K times greater section and a K times smaller number of turns.

4. A speed reducer device as in claim 1 or 3 wherein the windings are all identical.

5. A speed reducer device according to claim 1 or 3 wherein the whole number n is equal to 4 and in that the safety means are provided for automatically cancelling out, at least partially, from appropriate dangerous thresholds, the energization of the speed reducer for respectively positions 3 and 4 of the control member.

6. A speed reducer device according to claim 5, wherein the safety means are slaved to time and are arranged so as to cancel out at least partially the energization of the speed reducer after a delay $t_1$ between 10 and 30 seconds for position 4 of the control member and after a delay $t_2$ between 1 and 4 minutes for position 3 of said member.

7. A speed reducer device according to claim 1 wherein the voltage source is a battery capable of withstanding without damage short and repeated discharges and to deliver, during these discharges, high amperage currents, the recharge of this battery being easily and rapidly ensured.

8. A speed reducer device as in claim 1 or 3 wherein the number n is equal to 4 and the power P is about 2,500 Watts, each winding being made of two coils, each having about 225 turns of copper wire having a section of about 6 mm$^2$.

9. A speed reducer device as in claim 8 wherein K is equal to $\sqrt{2}$.

10. A speed reducer device as in claim 1 wherein said safety means further automatically prevents the device from reaching a dangerous threshold when the control member is in its $n-1$ position.

11. A speed reducer device for vehicles comprised of an eddy current speed reducer having a predetermined number of inductor windings, a DC voltage source and control means for energizing said predetermined number of inductor windings in a predetermined sequence thereby causing the device to generate a plurality of braking torques having values ranging from 0 to a predetermined maximum value based on the number of inductor windings being energized, said control means having a plurality of control positions through which it is successively moved so that at each successive control position said DC voltage source is connected to an increasing number of inductor windings, wherein the section of the conductor wire forming each of the inductor windings is enlarged by a factor K and the number of turns in each winding is reduced by a factor K, K being a coefficient between 1.1 and 1.7, so that the maximum power available from said source becomes $K^2P$ where P equals the maximum electrical power able to be absorbed by the windings when energized permanently without damage to the device and ranging from about 2000 to about 3500 Watts, said device further including safety means for automatically reducing the number of inductor windings energized in response to a predetermined sensed condition.

12. A speed reducer device as in claim 11 wherein said safety means comprises a timing device.

13. A speed reducer device as in claim 11 wherein said safety means comprises at least a first timing device for limiting the time at which said control means energizes the greatest number of inductor windings and a second time for limiting the time at which said control means energizes the second greatest number of inductor windings.

14. A speed reducer device as in claim 13 wherein said first time limits energization for a period ranging from about 10 seconds to about 30 seconds and said second timer limits energization for a period ranging from about 1 minute to about 4 minutes.

15. A speed reducing device according to claim 11 wherein the power $K^2P$ ranges from about 4,000 to about 7,000 Watts.

16. A speed reducer device as in any one of claims 11, 12, 13, 14 or 15, wherein K is equal to $\sqrt{2}$.

17. A speed reducing device in any one of claims 11, 12, 13, 14 or 15 wherein the windings are all identical.

* * * * *